United States Patent
Weiss et al.

(10) Patent No.: US 6,412,295 B2
(45) Date of Patent: Jul. 2, 2002

(54) SORPTION DEVICE FOR HEATING AND COOLING GAS STREAMS

(75) Inventors: Rüdiger Weiss, Markdorf; Jürgen Just, Frickingen; Hartmut Gehse, Markdorf; Peter Maier-Laxhuber, Dietersheim; Reiner Worz, Reichertshausen; Andreas Becky, Ottobrunn; Leo Totschnig, München; Christoph Grupp, Munich, all of (DE)

(73) Assignee: Zeo-Tech Zeolith Technologie, GmbH, Unterschleissheim (DE)

( * ) Notice: Subject to any disclaimer, the term of this patent is extended or adjusted under 35 U.S.C. 154(b) by 0 days.

(21) Appl. No.: 09/876,394

(22) Filed: Jun. 7, 2001

(30) Foreign Application Priority Data

Jun. 9, 2000 (DE) .......................... 100 28 030

(51) Int. Cl.[7] ............................... F25B 27/00
(52) U.S. Cl. .................... 62/238.3; 62/480; 165/104.12
(58) Field of Search ................. 62/238.3, 101, 62/457.9, 476, 480; 165/104.12

(56) References Cited

U.S. PATENT DOCUMENTS 4,195,488 A * 4/1980 Hastwell ........................ 62/4

* cited by examiner

Primary Examiner—Denise L. Esquivel
Assistant Examiner—Melvin Jones
(74) Attorney, Agent, or Firm—Hoffmann & Baron, LLP

(57) ABSTRACT

A sorption device for heating and cooling gas streams, with a sorbent container which contains a sorbent that takes up a working fluid which evaporates in an evaporator that contains a quantity of working fluid in correspondence with the quantity of sorbent, with a sorbent heat exchanger which exchanges the heat between a sorbent and a sorbent gas stream, with a working fluid heat exchanger which exchanges the heat between working fluid, and with a working fluid gas stream, and a closable valve between the sorbent container and the evaporator, which valve is able to interrupt the flow of the working fluid vapor, with both the sorbent heat exchanger and the working fluid heat exchanger having at their inlets and outlets connecting elements which can be readily attached to, detached from, and exchanged for one another on the gas flow channels for supplying and discharging gas streams that are to be heated or cooled.

20 Claims, 2 Drawing Sheets

SORPTION DEVICE FOR HEATING AND COOLING GAS STREAMS

FIELD OF THE INVENTION

The present invention concerns a sorption device for heating and cooling gas streams according to the precharacterizing portion of claim 1.

BACKGROUND OF THE INVENTION

Sorption devices are apparatuses in which a liquid or solid sorbent takes up a second fluid which boils at a lower temperature, the so-called working fluid, in the form of a vapor while releasing heat (sorption). In the course of this process, the working fluid evaporates in an evaporator while absorbing heat. After the sorbent is saturated, it can again be desorbed when heat is added to it (regeneration). At that time, the working fluid evaporates from the sorbent. The working fluid vapor can be recondensed and can subsequently be vaporized again in the evaporator.

Sorption devices for cooling with solid sorbents are known from the European Patent No. EP 0 368 111 and the German Patent Application [Offenlegungsschrift] No. DE-OS 34 25 419. Sorbent containers that are filled with sorbents draw off the working fluid vapor which forms in an evaporator and take it up in the sorbent packing while releasing heat. Subsequently, the heat of sorption must be dissipated from the sorbent packing. The cooling devices can be used for cooling and heating food products in thermally insulated boxes.

The sorption cooling system known from the European Patent No. EP 0 368 11 1 comprises a portable cooling unit and a stationary charging station that can be separated from the cooling device. The cooling device comprises a sorbent container that is filled with a solid sorbent and an evaporator that contains a liquid working fluid and a heat exchanger embedded therein. The evaporator and the sorbent container are connected to each other via a vapor line that can be shut off. Liquid media which are cooled to the temperature desired by opening and closing the shut-off device flow through a heat exchanger that is embedded in the evaporator. After the sorbent is saturated with the working fluid, it can be heated in the charging station. The working fluid vapor that forms is recondensed in the evaporator. The heat of condensation is discharged by means of cooling water which must flow through the embedded heat exchanger.

The problem to be solved by this invention is to make available a sorption device that is suitable both for the heating and, as an alternative, for the cooling especially of gas streams.

OBJECTS AND SUMMARY OF THE INVENTION

This problem is solved by the characterizing features of claim 1. The dependent claims disclose additional devices and methods in which the sorption device according to this invention can be used.

Thus, a sorption device according to the present invention contains a sorbent inside a sorbent container, a valve, and the liquid working fluid inside an evaporator. Via a sorbent heat exchanger, heat is added to the sorbent during the regeneration phase and removed from the sorbent during the sorption phase. Via a working fluid heat exchanger, heat of evaporation is added to the working fluid during the sorption phase and heat of liquefaction is removed during the regeneration phase. According to the present invention, the quantities of heat are transferred to and from gas streams which in turn are, respectively, fed into and discharged from gas flow channels. According to the present invention, at the inlets and outlets of both the sorbent heat exchanger and the working fluid heat exchanger, there are connecting elements which make possible a readily removable and exchangeable connection to the gas flow channels for feeding in and discharging the gas streams that are to be heated or cooled. In this manner, each sorption device can be used either for heating or for cooling a gas stream since either the sorbent heat exchanger or the working fluid heat exchanger can be connected to the gas flow channel desired. According to the present invention, it is also possible to provide for switching devices for routing the gas streams. The connecting elements and switching devices need not meet any special requirements. They should, however, make it possible to establish a simple, secure, gas-tight, and rapid connection between the flow channels and the heat exchangers. It is useful to ensure that the connections or attachments cannot be mistaken for one another.

If the connecting elements and the gas channels are symmetrically arranged, the sorption device needs to be only turned upside down or tilted so as to make it possible to switch from the heating function to the cooling function. In this case, the sorption device and the channels need not be folded, crossed, twisted or in any other way adjusted to fit the particular installation requirements.

Under certain circumstances, it may be necessary to protect the outlets and the inlets that lead to the gas flow channels by an incorporation of separate gas filters. This is especially true if the sorption device has to be used and exchanged in a poisoned, contaminated or polluted atmosphere. The separate gas filters thus offer protection against unfiltered gases throughout the time the device is used or switched.

It may also be useful if the gas flow channels is connected to a box and if provision is made so that the sorption device can be installed in the box in two different ways or if the gas flow channels can be suitably switched within the box. Depending on the application (heating or cooling), the desired heat exchanger can subsequently be connected to the appropriate gas flow channels. At the same time, the box might also contain the required air and gas supply units (e.g., fans), filters, and energy supply units, and it might be designed in the form of a portable or movable suitcase.

During the regeneration phase, the sorbent is heated and the working fluid vapor is desorbed. This vapor flows through the opened or self-opening valve to the evaporator where it condenses out. At the end of the regeneration phase, the heat supply into the sorbent is interrupted. As a result, the desorption of additional working fluid vapor is concluded. When the vapor valve closes, the working fluid vapor is prevented from flowing back. Subsequently, the desorbed working fluid in the form of a liquid is contained in the evaporator. Now the sorption device is ready and can be stored for any length of time desired. Per kilogram of zeolite, a sorption device according to the present invention is able to store 130 watt hours of cold and 160 watt hours of heat without loss over any length of time desired.

It is useful if the sorbent container and possibly also the sorbent heat exchanger are provided with a temperature-resistant thermal insulation to minimize the dissipation of heat into the surrounding air during the regeneration process. The regeneration can be carried out in a separate regeneration device. It is especially energy-efficient if the gas stream that exits from the working fluid heat exchanger after having absorbed the heat of liquefaction is heated by means of a heater to temperatures of approximately 300° C. and is subsequently introduced into the sorbent heat exchanger. In this manner it is possible to use only one single fan and one single gas stream for both heat exchangers and to preheat the gas stream with the heat of liquefaction. In this manner, the regeneration device can have a simple design, it is safe to operate and, at the same time, it saves energy.

To initiate the sorption phase, the valve is opened. Now working fluid vapor can flow from the evaporator into the sorbent container and can be exothermally taken up by the sorbent. This cools the working fluid vapor in the evaporator as well as the gas stream that flows past inside the heat exchanger. To generate the maximum cooling capacity, the sorbent must be able to transfer its heat of sorption in a heat exchanger to a gas stream. An especially intensive refrigerating effect is achieved if the sorbent container has a sufficiently large heat exchanging surface for the gas stream that flows through it. Preferably, the sorbent is cooled to low temperatures so as to make it possible for it to take up the maximum quantity of working fluid at sufficiently low temperatures.

It is especially useful if the pair of sorbents used are zeolite and water. Zeolite is a crystalline mineral which has a regular skeletal structure made of silicon and aluminum oxides. This skeletal structure comprises cavities in which water molecules can be taken up while releasing heat. Within the skeletal structure, the water molecules are subjected to strong field forces which bind the molecules in the lattice and liquefy them. The strength of the binding forces that act upon the water molecules is dependent on the quantity of water that is already contained in the skeletal structure and on the temperature of the zeolite. For practical applications, up to 25 grams of water can be taken up per 100 grams of zeolite. Zeolites are solid substances which do not expand as a result of heat during the sorption and desorption reaction. The skeletal structure can be readily accessed from all sides by the water vapor molecules. The sorption devices can therefore be used in any position.

The use of water as a working fluid makes it possible to reduce the required control means to a minimum. As the water is vaporized in vacuo, the surface of the water cools to 0° C. and freezes to form ice as the evaporation process continues. This layer of ice grows rapidly until the resulting drop in pressure automatically reduces its growth. Thus, the layer of ice can be advantageously used to control the gas temperature. If only a small quantity of heat is transferred to the gas stream, the layer of ice grows, if a very large quantity of heat is transferred, the layer of ice melts. If the gas temperature is to be reduced to less than 0° C., substances that lower the freezing point can be mixed into the aqueous working fluid.

But it is also possible to use any other pairs of sorbents, as long as one of the sorbents is solid and remains solid even during the sorption reaction. Solid sorbents, however, are poor heat conductors and poor heat exchangers. Since the heat exchange between the gas stream and the sorbent heat exchanger is in the same order of magnitude, it is recommended that only heat exchangers without fins, such as those with a cylindrical, platelike or tubelike configuration, be used. Since especially zeolite granules are poor heat conductors, the sorbent containers should be designed so as to ensure that the average heat conducting path for the transformed quantities of heat is no greater than 2 cm.

A few solid sorbents, such as zeolite, are sufficiently stable to compensate for excess pressure on the outside of thin-walled containers. Additional reinforcements or thick-walled heat exchanging surfaces are therefore not necessary. Since the sorption device is under a vacuum when the working fluid used is water and since for the entire life of the device, gases should not be able to penetrate into the system, the valve should preferably be made of vacuum sealing components. For manual actuation, feedthroughs that are sealed by means of metal bellows have been shown to be useful.

For economical operations, zeolite temperatures in a range from 250 to 350° C. for the regeneration phase and from 40 to 80° C. for the sorption phase are recommended. Regeneration can be especially advantageously carried out by means of a stream of hot air at an air temperature of more than 300° C. If the zeolite packing layer is thin, the regeneration phase can be concluded within one hour. Special care should be taken to ensure that the condensation temperatures are kept below 100° C., which can be accomplished by an adequate flow of gas through the working fluid heat exchanger. If the temperatures were to be higher, the pressure inside the container would be increased to a level higher than the air pressure outside the container.

The sorption device is especially suitable for use in mobile applications, i.e., in situations in which no operating energy for air-conditioning or heating systems is available. This includes battery-operated automobiles and small airplanes, protective tents, EMS stretchers with protective covers, and protective clothing of all types. Depending on the season and the location in which the device is used, either ventilation, cooling or heating is required. A sorption device according to the present invention as one single unit is able to meet all three requirements. Especially when used in protective clothing, the sorption device should be light weight and wearable without much restricting the freedom of movement. Depending on the particular application, for example, it might be integrated into the air flow channels of the protective clothing on the person's back or chest.

A certain additional protection against flying splinters or other projectiles can be ensured by appropriately adapting the sorbent container and/or the working fluid container to the shape of a person's body.

A special advantage can be obtained if discharged humid air, in particular the expired air from protective masks, is introduced into the working fluid heat exchanger. The water vapor content of the humid air can thus be liquefied in the sorbent heat exchanger and can subsequently transfer a considerable quantity of the heat of evaporation required to the working fluid. The sorbent receives the working fluid vapor at a higher pressure and is thus able to readily transfer the heat of sorption at a higher temperature via the sorbent heat exchanger to the exiting gas stream which heats the protective clothing article.

A considerable advantage may also be obtained if the working fluid heat exchanger separates the gas streams into a minimum of two separate streams, the temperature at the exit opening and/or the volume streams of which are to be conditioned in different ways. In this manner, for example, the breathing air that is introduced into a protective clothing article can be made to have a temperature or humidity different from the air that controls the microclimate existing between the cover of the protective clothing article and the surface of the wearer's body. To be able to accommodate such functions, the sorption device according to the present invention may optionally be equipped with two valves or two containers for the working fluid.

During the cooling of a gas stream flowing through the working fluid heat exchanger, it is possible for a considerable quantity of condensate to be formed. This condensate should be discharged from the heat exchanger as safely and as effectively as possible. Since, as a rule, the pressure prevailing in the gas stream is slightly greater than the pressure prevailing in the surrounding medium, the accumulated condensate quantity can be discharged into the surrounding air via small openings. It is especially useful if the condensate is introduced into the sorbent heat exchanger and vaporized on the surfaces of the heat exchanger. In this manner, it is possible to reduce the gas stream that discharges the heat of sorption. A transfer of the condensate from the working fluid heat exchanger into the sorbent heat exchanger can also be accomplished by means of separate conduits or even by means of hygroscopic materials (wicks).

The temperatures of the gas streams exiting from the heat exchangers can be controlled by the settings of the valve as known from prior art. In addition to the temperatures, the moisture content of the gas streams can be used as a directly controlled variable for the valve setting.

The states of the exiting gas streams can, however, also be controlled in a different way which is independent of the valve setting. For example, to increase or decrease the temperature of the gas stream exiting from the working fluid heat exchanger, the flow of the gas through the sorbent heat exchanger can be increased or reduced. Since the thermodynamic equilibrium is established whenever the valve is opened, a reduction of the sorbent temperature, for example, will cause the temperature of the working fluid to be reduced, and an increase in the temperature of the sorbent will lead to an increase in the temperature of evaporation.

It is also useful if the valve is designed in the form of a check valve. In this case, the regeneration can also be carried out when the valve is closed. The working fluid vapor exiting from the sorbent automatically opens the check valve and condenses in the evaporator. Since the valve was not opened, it does not have to be manually closed at the end of the regeneration phase. This can be a special advantage in that it allows the sorption device to be handled safely.

The composition and the state of the cooled or heated gases in the sorption device are of no importance. In most cases, however, air streams will be used for cooling and heating. The conveying elements used will be mainly fans and blowers. According to the present invention, however, gases from supply stations or compressed-air pipe systems or air discharged from turbine engines of airplanes can be used as well.

In the drawings, a diagrammatic representation of a sorption device according to the present invention is shown.

BRIEF DESCRIPTION OF THE DRAWINGS

FIG. 1b shows the same sorption device, except that it is shown in the upside down position and prior to having been connected to the gas flow channels of FIG. 1a.

DETAILED DESCRIPTION OF THE PREFERRED EMBODIMENTS

Figure 1A:
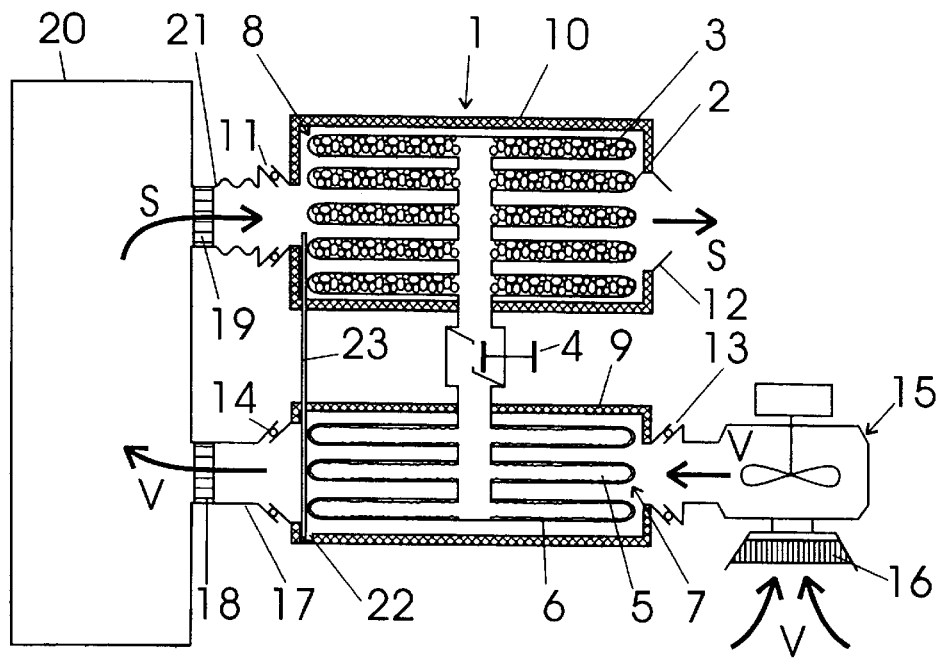
FIG. 1a shows a sectional view of a sorption device which is connected to three gas flow channels.

Sorption device 1 shown as a sectional view in FIG. 1 comprises a multicomponent container 2 for the sorbent that is filled with sorbent 3, a valve 4, and an evaporator 5 which contains working fluid 6. The surface of evaporator 5 which also comprises several components forms the working fluid heat exchanger 7, and the surface of container 2 for the sorbent forms the heat exchanging surface of the sorbent heat exchanger 8. Both the sorbent heat exchanger 8 and the working fluid heat exchanger 7 are surrounded by insulated housings 9,10 which route gas streams V and S between the two sorber connecting elements 11,12 and the two evaporator connecting elements 13,14. Connected to connecting element 13 is radial blower 15 which draws in gas stream V that is to be cooled—if required, by way of filter 16—and pushes it through the working fluid heat exchanger 7 and connecting element 14 into gas flow channel 17 which comprises a filter element 18. Like the identical filter element 19 in the gas flow channel 21, this filter element 18 protects a given protected zone 20 during an exchange of the sorption device against the penetration of noxious substances from the surrounding air. Gas stream S which exits the protected zone 20 via the flexible flow channel 21 cools sorbent 3 by means of the sorbent heat exchanger 8 until it exits from the sorption device by way of connecting element 12.

While cooling to below the dew point, gas stream V is able to discharge water which is collected in the condensate bottom 22, from which it is distributed via a condensate conduit 23 to the sorbent heat exchanger 8 by means of the existing difference in pressure. On the surface of the sorbent heat exchanger 8, the condensate is able to evaporate again and helps to further cool sorbent 3. The vapor that forms is discharged from gas stream S from the sorption device by way of connecting element 12.

Figure 1B:
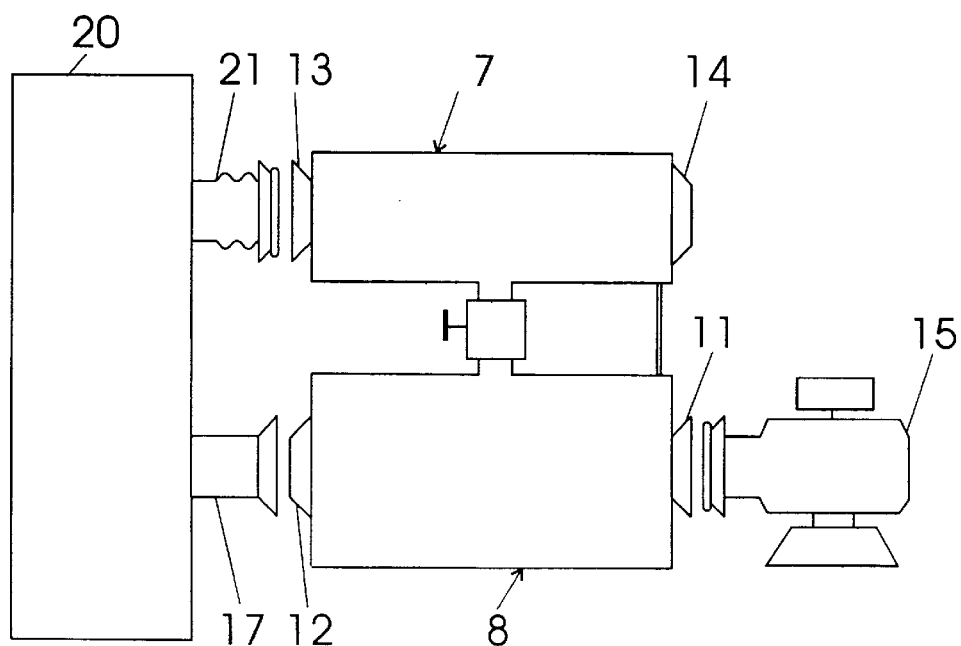

FIG. 1b comprises the same components as FIG. 1a but shows a view that is not sectioned and without the connections [to the gas flow channels] and with the difference that sorption device 1 is turned upside down so as to heat protected zone 20 rather than to cool it as shown in Figure 1a. Radial blower 15 stands ready to be connected to connecting element 11 and to draw in surrounding air during the heating operation, which air, after having passed through the sorbent heat exchanger 8 and thus being heated, is transported via connecting element 12 and gas flow channel 17 into protected zone 20. The gas stream that exists protected zone 20 via gas flow channel 21 is transported to the working fluid heat exchanger 7 via connecting element 13 and exits the sorption device via connecting element 14 after having discharged heat to the working fluid.

The way in which the gas stream flows through protected zone 20 as shown in FIGS. 1a and 1b is useful if only one single blower is to be responsible both for supplying the heat of evaporation and for dissipating the heat of sorption. It may, however, also be beneficial to exhaust the cooled or heated gas stream from protected zone 20 directly into the surrounding air. In this case, it will be necessary to provide an additional air or gas supply unit which supplies the second heat exchanger with a stream of gas.

Figure 2:
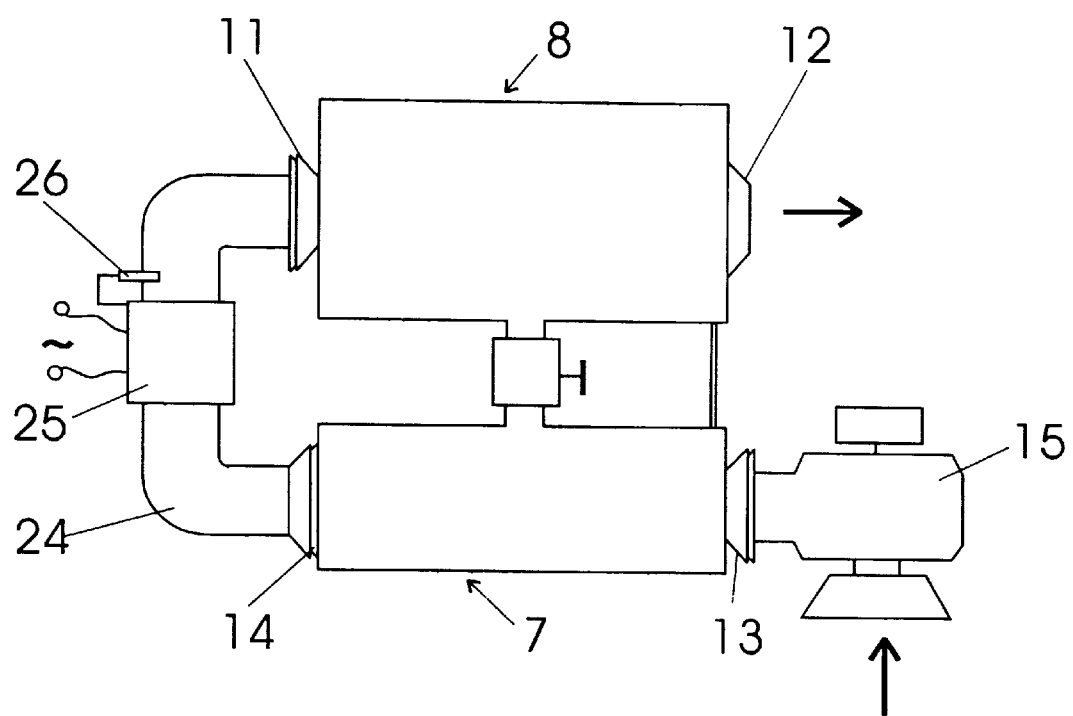
FIG. 2 shows a sorption device during a regeneration phase.

FIG. 2 finally shows sorption device 1 described above during a regeneration phase. Radial blower 15 pushes surrounding air through connecting element 13 into the working fluid heat exchanger 7, next through connecting element 14 into a heating duct 24 which contains an electric heating element 25, subsequently from there through connecting element 11 into the sorbent heat exchanger 8, and finally through connecting element 12 back into the surrounding air. Thus, one single radial blower 15 transports one single gas stream through the sorption device, which gas stream absorbs the heat of condensation in the working fluid heat exchanger 7 and is heated in heating element 25 to a temperature higher than 350° C. and subsequently dissipates the heat in the sorption device heat exchanger 8 to the sorbent. Thus, one single thermostat 26 which is located in the air stream downstream of heating element 25 ensures that the sorbent is heated to the required temperature and that, at the same time, the heat of condensation is safely discharged from the evaporator so as to prevent a dangerous increase in the pressure within the sorption device.

What is claimed is:

1. A sorption device for heating and cooling gas streams, with a sorbent container which contains a sorbent that takes up a working fluid which evaporates in an evaporator that contains a quantity of working fluid in correspondence with the quantity of sorbent, with a sorbent heat exchanger which exchanges the heat between a sorbent and a sorbent gas stream, with a working fluid heat exchanger which exchanges the heat between the working fluid and a working fluid gas stream, and with a closable valve between the sorbent container and the evaporator, which valve is able to interrupt the flow of the working fluid vapor, wherein both the sorbent heat exchanger and the working fluid heat exchanger, at the inlets and outlets, have connecting elements or switching elements which can be readily attached to, detached from, and exchanged for one another on the gas flow channels for supplying and discharging the gas streams that are to be heated or cooled.

2. The sorption device as defined in claim 1, wherein the surfaces of the sorbent container and of the evaporator serve, respectively, as the sorbent heat exchanger and the working fluid heat exchanger.

3. The sorption device as defined in claim 1, wherein the valve is a check valve by means of which the thermodynamic states of the gas streams exiting from the heat exchangers can be influenced.

4. The sorption device as defined in claim 1, wherein the sorbent container is designed to ensure that the average heat conducting path in the sorbent up to the surface of the container measures less than 2 cm.

5. The sorption device as defined in claim 1, wherein humidity which condenses out from the cooling gas stream in the working fluid heat exchanger can reach the sorbent heat exchanger through a connecting element.

6. The sorption device as defined in claim 1, wherein the sorption device is carried close to the body and that, as a result of its shape, it can contribute to protect the body against projectiles and splinters.

7. The sorption device as defined in claim 1, wherein the sorption device is suitable for being incorporated into a box into which the gas flow channels are leading.

8. The sorption device as defined in claim 7, wherein the box comprises suitable switching devices for routing the streams of gas.

9. The sorption device as defined in claim 1, wherein a switching means is provided which is able to route the gas streams to the heat exchangers in such a way that optionally either heating or cooling can be accomplished.

10. The sorption device as defined in claim 1, wherein the sorbent contains zeolite and that the working fluid contains water.

11. The sorption device as defined in claim 1, wherein the sorbent heat exchanger and/or the working fluid heat exchanger is equipped with a temperature-resistant thermal insulation which reduces the heat dissipation into the surrounding air as hot gases are passing through it.

12. The sorption device as defined in claim 1, wherein the connecting elements are geometrically configured in such a way that by turning the sorption device upside down or by tilting it, the two heat exchangers between the gas flow channels change their position and thus their function.

13. The sorption device as defined in claim 1, wherein the sorption device is connected to only one single air or gas supply unit and that the gas streams are routed in such a way that they pass through both the working fluid heat exchanger and the sorbent heat exchanger.

14. The sorption device as defined in claim 1, wherein the inlets and outlets of the gas flow channels are fitted with filters which, during the operation and/or an exchange of the sorption device, purify or detoxify toxic, contaminated, or polluted gas streams before these gas streams enter into the zones to be protected.

15. A method for using a sorption device as defined in claim 1, wherein, to cool a gas stream, the gas stream is passed through the working fluid heat exchanger and, at the same time, another gas stream is routed through the sorbent heat exchanger to as to absorb the heat.

16. A method for using a sorption device as defined in claim 1, wherein, to heat a gas stream, the gas stream is passed through the sorbent heat exchanger and, at the same time, another gas stream is routed through the working fluid heat exchanger to as to give off the heat.

17. A method for using a sorption device as defined in claim 1, wherein a gas stream that is to be heated first flows through the sorbent heat exchanger where it is heated, the gas stream subsequently gives off the heat to a heat consuming unit, and at least part of the gas stream is subsequently routed through the working fluid heat exchanger to further give off heat.

18. A method for using a sorption device as defined in claim 1, wherein a gas stream that is to be cooled first flows through the working fluid heat exchanger where it is cooled, the gas stream subsequently absorbs heat from a heat consuming device, and at least part of the gas stream is subsequently routed through the sorbent heat exchanger to further absorb heat.

19. A method for using a sorption device as defined in claim 1, wherein, to regenerate the sorbent, a hot gas stream is routed through the sorbent heat exchanger and, at the same time, a gas stream flows through the working fluid heat exchanger which takes up the heat of condensation of the working fluid vapor so as to prevent that the condensation pressure is higher than the pressure of the surrounding medium.

20. A method for using a sorption device as defined in claim 1, wherein the gas streams exiting from the sorption device heat or, as an alternative, cool closed zones, in particular, protective clothing articles, protective tents, and areas in which people gather.

* * * * *